J. A. KAYE.
BERRY PICKER.
APPLICATION FILED APR. 14, 1920.
1,406,874.
Patented Feb. 14, 1922.
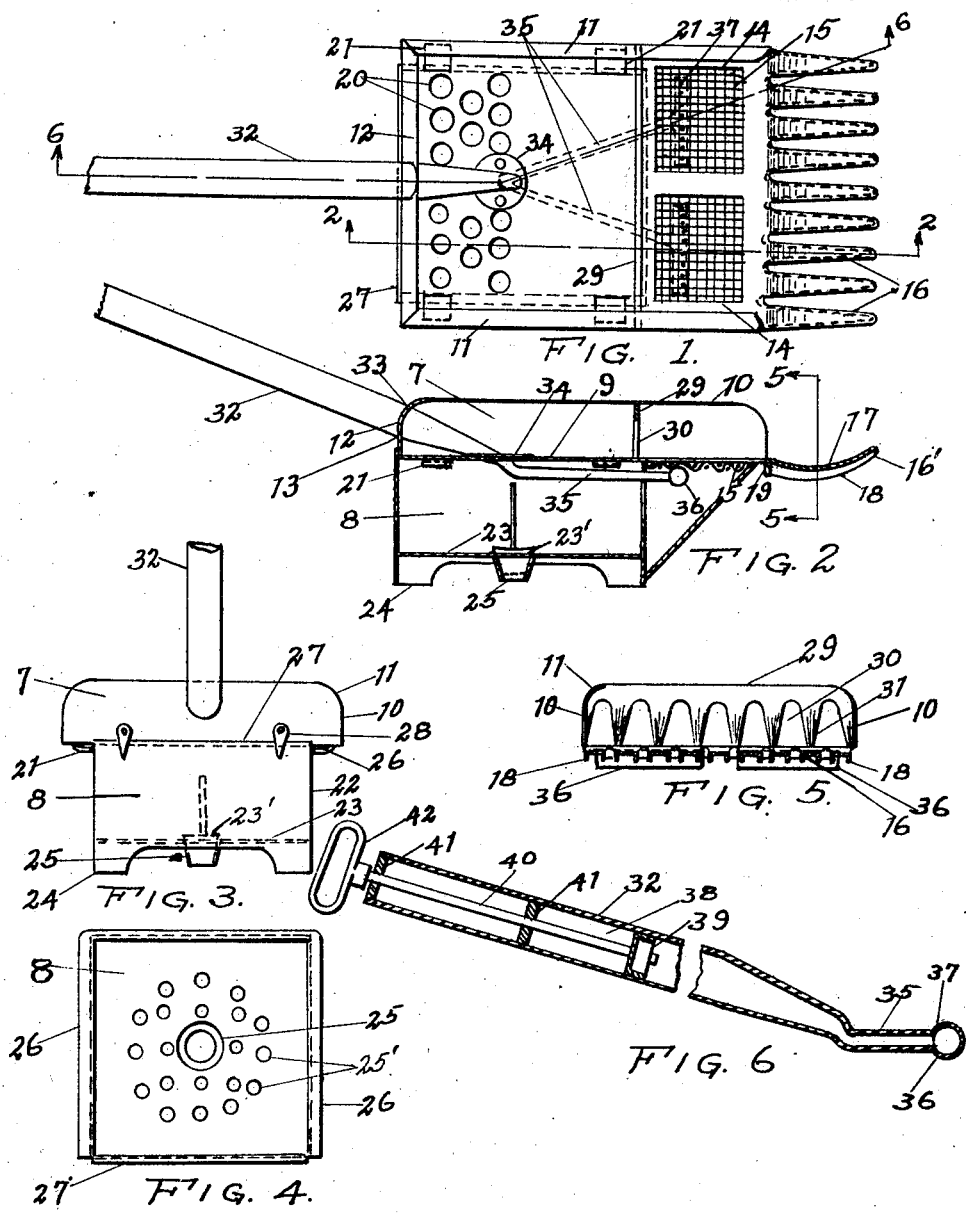
WITNESS:
Ethel McDaniel
INVENTOR.
John A. Kaye
BY
J. A. Sperry
ATTORNEY.

UNITED STATES PATENT OFFICE.

JOHN ARTHUR KAYE, OF SAULT STE. MARIE, ONTARIO, CANADA.

BERRY PICKER.

1,406,874.  Specification of Letters Patent.  Patented Feb. 14, 1922.

Application filed April 14, 1920. Serial No. 373,882.

*To all whom it may concern:*

Be it known that I, JOHN A. KAYE, a subject of the King of England, and a resident of the city of Sault Ste. Marie, Province of Ontario, and Dominion of Canada, whose local address is 224 Gloucester St., have invented certain new and useful Improvements in Berry Pickers, of which the following is a specification.

My invention relates to berry pickers in general and more particularly to hand-operated berry pickers particularly adapted to picking blue berries, and the like, a special object of the invention being to provide a simple and novel construction which shall be light in weight and sanitary in construction, and which shall serve to separate the berries from dust, dirt, leaves and other objectionable matters. A further object is to provide a device which shall be an improvement on the inventor's former Patent #1,283,526. A further object is to provide a device of this sort which may be readily taken apart for removal of the berries therefrom, and which shall be provided with supplementary means other than screens for the removal of leaves and dust from said berries, during said picking operation.

With these and other objects in view, my invention consists essentially of the novel features of construction shown in the accompanying drawings which illustrate a preferred form of the device, it being understood that I may make such modifications of this construction as legitimately come within the scope of the appended claims.

In the drawings Fig. 1 illustrates a plan view of the device with a portion of the handle removed. Fig. 2 illustrates a side elevation of the construction in section on line 2—2 of Fig. 1. Fig. 3 is a rear view of the device, and Fig. 4 is a plan view of the berry-receiving receptacle. Fig. 5 is a front elevation of a portion of the device on line 5—5 of Fig. 2, while Fig. 6 is a sectional elevation essentially on line 6—6 of Fig. 1.

In the drawings the numeral 7 indicates the picking and cleaning portion as a whole, and 8 indicates the berry-receiving receptacle as a whole. The portion 7 consists essentially of a bottom plate 9, and side walls 10, the upper portions of which are inwardly inclined as at 11, and a back wall 13 similarly inclined, as at 12. The forward portion of the bottom 9 has a plurality of openings 14 which may be covered by screens 15. This bottom is further extended forwardly by a plurality of fingers 16 which are preferably curved as at 17, and which are provided with downwardly extended flanges 18 on either edge thereof, each finger being further provided with a downwardly extending flange 16' at its outer extremity, and a downwardly extending flange 19 at its rear extremity, said flange 19 connecting the flanges on adjacent fingers. The rear portion of the bottom 9 is also provided with a plurality of openings 20, above the receptacle 8, and is further provided with a plurality of integrally formed lugs or tongues 21 to support the receptacle 8 therefrom.

The receptacle 8 consists essentially of a plurality of side walls 22 and a bottom 23, the walls being formed into depending feet or supports 24, and having a plurality of outwardly extending flanges 26, at the upper edges of said walls 22. The rear wall of this receptacle may be projected upwardly as at 27 to engage with the back wall 13 of portion 7, this wall carrying a plurality of locking members 28, pivotally attached thereto. The bottom 23 is provided with a single opening 25, downwardly projecting therefrom, said opening being preferably in the form of a truncated cone and fitted with a removable plug or stopper 23'. A plurality of openings 25' may be provided in bottom 23 if so desired.

Within the portion 7 a supplementary separator or wall 29 may be provided, said wall having a plurality of openings 30, and fingers or ribs 31, depending therefrom, and it is also provided with a rearwardly extending handle 32, preferably passing through rear wall 13, as at 33, and being attached to the bottom 9 by a flange 34. Handle 32 may be hollow as at 38, the hollow portion being fitted with a removable plunger or piston 39, which is connected as by rod 40 to a suitable handle 42 without said handle, said rod being guided by suitable bearings 41 within said handle. The handle portion may pass through bottom 9, and extend forwardly as by the bifurcated tubes 35, said tubes communicating with the elongated chambers of heads 36, said heads being provided with a plurality of openings or outlets 37.

In operation the device is carried by the handle, and the fingers 16 are run under the berries, and pull or scoop them from the bushes. The berries then pass backward over the screens 15, where dust and dirt are removed from them. They then pass through the openings 30, the depending fingers 31 preventing leaves and branches from passage through the separator 29. The berries then pass through the openings 20 into receptacle 8 where they collect until said receptacle is filled. When full, the receptacle is removed from the portion 7 by releasing the locks 28 when the device may be placed over suitable boxes and by removal of the plug 23 the boxes will be filled with berries from said receptacle. Leaves and other matter collecting on screens 15 may be removed therefrom during the picking operation by an occasional operation of the piston 39, forcing a blast of air through the bifurcated tubes 35, and through the openings 37 in the heads or chambers 36.

Having thus described my invention, what I claim as new and desire to protect by these Letters Patent is:

1. In a berry picker, the combination with a handle, of a metallic body portion having a bottom and side walls formed from a single piece of metal, the bottom being forwardly projected and cut to form a plurality of integrally attached fingers, flanges projecting from said fingers, said bottom being also provided with screen covered openings through said bottom rearwardly of said fingers, a receptacle removably attached beneath the rear portion of said body portion, said body having a plurality of openings communicating with said receptacle, an opening through the bottom of said receptacle, means for closing said opening and means for securing said handle to said body portion, substantially as described.

2. In a berry picker a body portion with integrally formed fingers projecting from one end thereof, flanges depending from said fingers, a screen-covered portion rearwardly of said fingers, a separator wall rearwardly of said screen-covered portion, openings through said separator wall, inwardly curved side and rear walls integrally attached to said body, a hollow handle attached to said body, a plunger or piston within said hollow handle, means for longitudinally moving said piston, bifurcated tubes connected operatively with said hollow handle, distributor heads attached to said tubes, outlet openings in said distributor heads, said distributor heads being positioned adjacent said screen-covered portion, a receptacle removably attached to said body portion, an opening through the bottom of said receptacle, means for closing said opening and means for securing said receptacle to said body portion, substantially as and for the purpose described.

In testimony whereof I have hereunto signed my name in the presence of two subscribing witnesses.

JOHN ARTHUR KAYE.

Witnesses:
FLORENCE COMAS,
RUBY KIRBY.